United States Patent [19]

Oh

[11] 4,083,797

[45] Apr. 11, 1978

[54] NEMATIC LIQUID CRYSTAL COMPOSITIONS

[75] Inventor: Chan S. Oh, Diamond Bar, Calif.

[73] Assignee: Beckman Instruments, Inc., Fullerton, Calif.

[21] Appl. No.: 581,009

[22] Filed: May 27, 1975

Related U.S. Application Data

[63] Continuation-in-part of Ser. No. 502,659, Sep. 3, 1974, and Ser. No. 502,658, Sep. 3, 1974, Pat. No. 3,975,286.

[51] Int. Cl.$^2$ ............................ C09K 3/34; G02F 1/13
[52] U.S. Cl. .................................. 252/299; 350/350
[58] Field of Search ............... 252/299, 408; 350/150, 350/160 LC

[56] References Cited

U.S. PATENT DOCUMENTS

| 3,891,307 | 6/1975 | Tsukamoto et al. | 350/160 LC |
|---|---|---|---|
| 3,975,286 | 8/1976 | Oh | 252/299 |
| 4,011,173 | 3/1977 | Steinstrasser | 252/299 |
| 4,020,002 | 4/1977 | Oh | 252/299 |

FOREIGN PATENT DOCUMENTS

| 814,291 | 8/1974 | Belgium | 252/299 |
|---|---|---|---|
| 807,165 | 3/1974 | Belgium | 252/299 |
| 2,181,943 | 12/1973 | France | 252/299 |
| 2,502,904 | 7/1975 | Germany | 252/299 |
| 2,454,570 | 5/1975 | Germany | 252/299 |
| 4,988,791 | 8/1974 | Japan | 252/299 |
| 5,023,385 | 3/1975 | Japan | 252/299 |

*Primary Examiner*—Benjamin R. Padgett
*Assistant Examiner*—T. S. Gron
*Attorney, Agent, or Firm*—Robert J. Steinmeyer; Ferd L. Mehlhoff

[57] ABSTRACT

Nematic liquid crystal compositions for use in displays and in other liquid crystal applications comprising a mixture of a nematic biphenyl liquid crystal material, nematic liquid crystal material other than nematic biphenyl which is incompatible with the nematic biphenyl (e.g. when mixed together, it will form a smectic phase instead of a nematic phase) which is present in a concentration that will render the total mixture with improved electro-optic properties and nematic liquid crystal material other than a nematic biphenyl which is compatible with the nematic biphenyl and present in a concentration sufficient so that the mixture forms a satisfactory nematic phase for use in a field-effect display device. The preferred biphenyl-incompatible constituents are certain ester-type nematic liquid crystals and the biphenyl-compatible constituent are other certain ester-type nematic liquid crystal. Further preferred embodiments are the selection of positive dielectric anisotropic (PDA) materials and negative dielectric anisotropic (NDA) materials and the inclusion of certain chiral additives. These liquid crystal mixtures exhibited very good electro-optic characteristics (e.g. low threshold voltages and fast response times).

36 Claims, No Drawings

NEMATIC LIQUID CRYSTAL COMPOSITIONS

CROSS-REFERENCE TO RELATED APPLICATIONS

This application is a continuation-in-part of both application Ser. No. 502,659 filed Sept. 3, 1974 entitled BIPHENYL BASED LIQUID CRYSTAL COMPOSITIONS, Chan S. Oh, and application Ser. No. 502,658 filed Sept. 3, 1974, U.S. Pat. No. 3,975,286, entitled LOW VOLTAGE ACTUATED FIELD EFFECT LIQUID CRYSTAL COMPOSITIONS AND METHOD OF SYNTHESIS, Chan S. Oh. These applications are incorporated herein by reference except to the extent they are inconsistent herewith.

BACKGROUND OF THE INVENTION

This invention relates to nematic liquid crystal compositions of the type used for display and information handling and particularly relates to liquid crystal compositions suitable for use in field-effect (or "twisted nematic") liquid crystal display devices.

References No. 1 through 14, listed at the end of the specification, provide a background of the general subject matter of the present patent and References No. 15 through 25 relate more particularly to the compounds discussed herein. The content and disclosure of these references is incorporated herein by reference and a knowledge of the disclosures of these references is assumed. The operation and construction of field-effect or twisted nematic liquid crystal display units of the type referred to hereinafter are described in these references.

Twisted-nematic liquid crystal display devices conventionally consist of two transparent substrates spaced a very small distance, e.g. 12.5 microns apart, the space being filled with a "nematic liquid crystal". (Hereinafter a "nematic liquid crystal" will be understood as a material which assumes its "ordered" nematic liquid phase at the temperature assumed; and similarly for a "smectic liquid crystal material.) Upon the application of a voltage between the two substrates, the light transmissive characteristics of the liquid crystal can be controlled to provide light transmission or to block off the transmission of light. Thus, these liquid crystal devices can serve effectively as very rapidly acting "light gates". The prior art devices generally operate with a voltage of from about 6 volts to 10 volts or higher for cells in which the substrates are separated on the average by 12.5 microns. In practice, separations less than about 12.5 microns average are difficult to obtain on a repeatable basis and mass production of cells with smaller spacings is not practical.

The output of the most desirable (integrated) timing, counting, and like circuits for current liquid crystal devices is from about 2.5 to about 3.3 volts; however, in the prior art, it has been necessary to multiply this voltage two or more times in order to obtain sufficient voltage to actuate or start up liquid crystal devices.

The prior art has been faced with another problem in the high consumption of energy in integrated circuitry, voltage multipliers and the display of liquid crystal devices. Energy consumption is particularly important in certain portable display devices such as liquid crystal display wrist watches. It is a practical necessity that batteries last for six to twelve months in wrist watches. This has not heretofore been a readily achievable goal principally because the problem of power consumption continues to plague the industry. One method by which power consumption can be reduced is to operate the liquid crystal display device at the inherent output voltage (e.g. 2.5 to 3.3 volts), of a typical integrated circuit. This requires less power and with the elimination of the voltage multiplier circuitry, has offered a particularly advantageous route to the reduction of energy consumption. Heretofore, however, this source of reduced energy consumption has not been successfully pursued because of the impossibility, or the impracticability, of operating liquid crystal display devices having less than about five or six volts.

Biphenyl liquid crystals are taught in the prior art and considerable work has been done by Gray (Reference 19) and his co-workers. Nematic biphenyl liquid crystals have been shown to be considerably more stable than Schiff-base compounds and have been actuated with lower saturation voltages than Schiff base. Gray et al. (Reference 19) report, for example, that for a particularly attractive member of this class of compounds, 4'-n-pentyl-4-cyanobiphenyl (PCBP) the $V_{th}$ was 1.1 $V_{rms}$ and at an applied voltage of 3 $V_{rms}$ the compound gave acceptable decay and rise times of 150 and 100 milliseconds.

However, lack of general availability of high quality nematic biphenyl liquid crystal compounds, the extremely high cost of such compounds, and the narrow nematic temperature ranges exhibited by many of these class of compounds suggested the desirability of alternative compositions which would retain the advantages of nematic biphenyl and obviate the principal disadvantages of these materials.

I have therefore discovered that adding certain mixtures of ester-type liquid crystals to nematic biphenyl which retain to a large extent the advantage of nematic biphenyls (e.g. chemical stability and fast response times) but reduce the cost, reduce the electrical capacitance, and expand the operational temperature range of display devices which are actuated with low voltages (i.e. 3.5 $V_{rms}$ or less).

It had been assumed by those in the art that when two different types of nematic liquid crystals were mixed together, a composite nematic liquid crystal mixture would always result; for instance, that if a Schiff-base nematic was mixed with an ester-type nematic, a liquid crystal having nematic characteristics would be formed. However, I discovered that when certain ester-types are mixed with certain nematic biphenyls (i.e. cyanobiphenyls), an incompatible state results. Specifically, certain of these materials formed an undesirable smectic phase instead of a nematic phase. Moreover, some blends were not smectic but produced undesirable homeotropic alignment, especially in the "fill-hole" areas of the display.

I further discovered that this incompatible state (e.g. smectic phase) could be supressed by the addition of a third component which was "compatible" with the nematic biphenyl, i.e. a component which formed a satisfactory nematic phase when mixed with the biphenyl. Moreover, I discovered that such three-component mixtures were superior to a nematic biphenyl by itself as well as to two-component mixtures of nematic biphenyls and "compatible" liquid crystals. (See application Ser. No. 502,659 mentioned above.)

While these three-component blends also show much improved electro-optical properties over prior art liquid crystal compositions, some troublesome problems still persisted; for instance, extreme sensitivities in response times resulting from slight changes in positive dielectric anisotropy (PDA) concentration and external factors (e.g. different display glasses, dirt and impurities) have arisen.

But, I have also discovered that by designing the total composition in terms of PDA/NDA constituents and by the addition of a small amount of certain chiral additives, the latter problems will be overcome and, surprisingly, the mixtures will derive unexpected beneficial characteristics (as explained below). As a result of this discovery, blends made according to this invention can be optimized in terms of their electro-optical performance and so as to be less sensitive to minute changes in concentration and other factors.

SUMMARY OF THE INVENTION

Accordingly, the present invention involves novel composite nematic liquid crystal compositions having satisfactory nematic properties for use in field-effect liquid crystal display devices comprising a blend of (1) at least one nematic biphenyl liquid crystal ("Base" NLC) material, (2) at least one other "non-biphenyl" nematic liquid crystal ("Supplemental" NLC) material which is optimal for supplementing the operating field-effect properties of this nematic biphenyl crystal material and present in a concentration that will render a resistant mixture with improved electro-optical field-effect properties (i.e. retain the advantages of the nematic biphenyls, such as low threshold voltages, fast response times and very good stability, while ameliorating such disadvantages of the biphenyl, for example as its extremely high cost and its relatively narrow nematic temperature range, and (3) at least one second non-biphenyl type nematic liquid crystal material which is relatively more "compatible" with the Base NLC (biphenyl) than the "Supplemental NLC" material and which is present in a concentration sufficient such that the resultant ternary which is a NLC mixture with satisfactorily nematic properties, providing a superior field-effect liquid crystal display device at the assumed conditions (e.g. operating temperature).

A preferred embodiment of the present invention is a nematic composition consisting of a ternary mixture of (1) positive dielectric anisotropy (PDA) nematic liquid crystals at least one of which is a cyanobiphenyl; (2) negative dielectric anisotropy (NDA) liquid crystals, at least one of which is an ester-type liquid crystal which is "compatible" with the biphenyl; more preferred includes an "incompatible" ester NLC added as well, sufficient to additionally supplement the electro-optical field-effect properties of the resultant mixture and (3) chiral additives.

The cyanobiphenyl liquid crystal must include one or more of the following compounds

where R is an alkyl or alkoxy group having 1 to 9 carbon atoms and are more completely described in U.S. Ser. No. 502,658.

The NDA ester-type liquid crystals must include the following compounds:

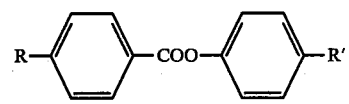

wherein R and R' are alkyl or alkoxy groups having 1 to 7 carbon atoms or,

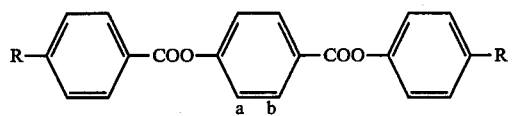

wherein R and R' are alkyl groups of 1 to 7 carbon atoms and $a$ and $b$ may both be H and wherein either $a$ or $b$, but not both, may be Cl. These are more completely described in U.S. Ser. No. 502,659.

The chiral additives are defined to include compounds selected from the group having the general formulae:

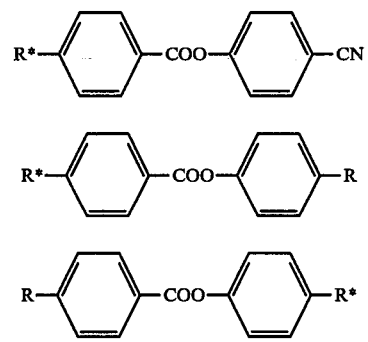

wherein R* is an alkyl or alkoxy group having 4 to 9 carbon atoms, among which at least one carbon atom is asymmetrically substituted and R is alkyl or alkoxy group having 2 to 7 carbon atoms. These are more completely described in U.S. Ser. No. 502,658.

The above constituents are mixed in proportions of about 10 to about 80 mole percent PDA with about 90 to about 20 mole percent NDA ester, and also containing about 0.05 to about 10.0 mole percent of chiral additives. The chiral additive can be one simple component or mixtures thereof. The resulting compositions exhibit a broad nematic temperature range and can be actuated with voltages of about 3.0 $V_{rms}$.

These compositions can be advantageously used in low-voltage field-effect liquid crystal devices employed as displays and in other liquid crystal applications.

Thus, one object of this invention is to prepare a liquid crystal composition which can be employed in low voltage liquid crystal display systems and will repeatedly exhibit very good electro-optic characteristics.

Another feature of this invention is to provide such a system whereby the response times, the optical alignment properties, and the threshold and saturation voltages can be tailored readily simply by the addition of a small amount of chiral additives to a liquid crystal mixture.

One advantage of the present invention is that one can achieve many desired nematic temperature ranges with mixtures of materials which are completely chemically inert and moisture-tolerant, this ensuring display longevity and simplifying packaging.

Another advantage is that one can freely adjust the concentrations of a positive dielectric anisotropy material so as to yield a mixture of liquid crystals with flexible dielectric anisotropy values, so as to effectively tailor threshold and saturation voltages, as well as response saturation voltages, response times and cell capacitance.

Workers in the art will appreciate the unique advantage whereby my discoveries teach: How to use a nematic biphenyl in a practical sense, that the preferred cyanobiphenyls are "incompatible" with all but a few good workable ("compatible") nematic ester materials (as well as with most, if not all, other nematic materials such as Schiff-base, tolane-type and the like); that, while a preferred co-nematic is "incompatible" with cyanobiphenyls (giving non-nematic, smectic properties to the resultant mixture), this can be remedied by simply adding such a compatible ester as a second co-nematic with the result that the overall (ternary) liquid crystal mixture exhibits satisfactory electro-optical properties (properties synergistically, and surprisingly, superior to those of any one constituent and to any one constituent and to any binary mixture thereof; for instance, allowing combination of a "base" cyanobiphenyl with an optimal "Supplemental" but "incompatible" ester; and that a "smectic" mixture (see Example 2 below) can, surprisingly, be made practical for liquid crystal operation by addition of such a "compatible" ester, whose smectic mixtures have heretofore been considered as electro-optically useless).

The foregoing and other objects, features and advantages of the present invention will be more readily understood upon consideration of the following detailed description.

DETAILED DESCRIPTION OF THE INVENTION

For this application, a "basic" type of liquid crystal material is defined as being one of major types of chemicals which can produce nematic liquid crystal characteristics. Included are biphenyls, ester-types, Schiff-bases, azo-types, azoxy-types, stilbene-types and tolane-types.

Also, an "incompatible" nematic liquid crystal material is defined for purposes of the present invention as a specific nematic liquid crystal material which when mixed with another "basic" type nematic liquid crystal material at some concentration at ambient temperature will form a "non-nematic" phase (e.g. smectic, glassy, solid, or isotropic/liquid phase) or else form a nematic phase which exhibits appreciable gross alignment problems (e.g. undesirable alignments of nematic direction) so that a satisfactory nematic phase for use in display devices is not produced.

Still further, a "compatible" nematic liquid crystal material is defined for purposes of the present invention as a specific nematic liquid crystal material which when mixed with a specific basic-type nematic liquid crystal material in any concentration forms a nematic phase with no appreciable gross alignment problems, and resulting in a nematic phase which can be used satisfactorily in display devices.

In arriving at the present invention, positive dielectric anisotropy (PDA) cyanobiphenyl liquid crystals were investigated because of their known desirable characteristics of good stability, being actuated with lower saturation voltages than Schiff base liquid crystals. They were known to be nematic biphenyl liquid crystals which could be employed in field-effect-type liquid crystal displays. However, as stated above, problems arise (e.g. extremely high cost) which prevent the employment of cyanobiphenyls by themselves. Therefore, I turned to using cyanobiphenyls with other types of nematic liquid crystals (e.g. esters and Schiff-base). What was hoped for, generally, was to obtain a less expensive liquid crystal composition which would be nematic over a wide range of temperatures and constituent variation, would be stable in use, and would be capable of being actuated with low voltages, e.g. about 1.5 to 3.5 volts (referred to below simply as characteristic of "3 volt" devices).

Accordingly, work was first done to select the best cyanobiphenyls that could be employed as a liquid crystal. Lower alkyl and alkoxy-cyanobiphenyls were found to be generally the best for these purposes since they were generally chemically inert (i.e. thus would not react in or degrade LC displays) and could produce fast response times. Alkyl-cyanobiphenyls having 1 to 9 carbon atoms are preferred over the corresponding alkoxy cyanobiphenyls because they were generally more economical to make and use and because they have lower melting points, so that their nematic range generally lies well below the normal ambient room temperature range. In particular, the most preferred cyanobiphenyl was 4-cyano-4'-n-pentylbiphenyl. This compound had nematic characteristics going done to relatively very low temperatures, while other alkyl-cyano-biphenyls exhibited somewhat smectic characteristics and were solid at ambient temperatures. When using more than one biphenyl (i.e. mixtures), it may be desirable to choose ones that have similar electro-optical properties so these problems will be strengthened rather than weakened.

From my experimenting, it was surprisingly discovered that cyanobiphenyls were incompatible with most ester-type and Schiff-base liquid crystals. For instance, while both cyanobiphenyls and an ester-type liquid crystal could be nematic over a desired range, mixtures of both usually developed a smectic phase at a normal ambient room temperature range between 20 and 80 weight percent of cyanobiphenyl leaving only high concentration of either component predominantly nematic. A system as complex as this was considered impractical and did not show any particular advantage technically.

In particular, such a "smectic" resulted when mixing 4-cyano-4'-n-pentylbiphenyl with 4'-anisylidene-4-n-butylaniline. 4-cyano-4'-n-octyloxybiphenyl when mixed with 4'-anisylidene-4-n-butylaniline and also with 4'-n-hexyloxyphenyl-4-n-butylbenzoate forms a smectic phase, the latter giving an extremely complex phase diagram.

These data, and similar results using other cyanobiphenyl-ester mixtures and cyanobiphenyl-Schiff-base combinations suggested that cyanobiphenyl generally could not be combined with other types of liquid crystals. However, by further study I inadvertently discovered three kinds of ester-type liquid crystals which are sufficiently "compatible" with cyanobiphenyls to provide new liquid crystal compositions. (See application Ser. No. 502,659 mentioned above.)

The first such group of "compatible" liquid crystals are compounds which are NDA ester type having the formula:

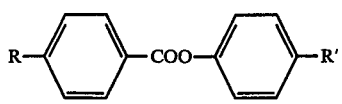

wherein R is methoxy and R' is a 1 to 7 carbon atom alkyl or alkoxy group, and wherein R is a 1 to 7 carbon atom alkyl or alkoxy and R' is a methoxy. These compounds are miscible in widely varying proportions with cyanobiphenyls and mix with them to yield liquid crystal compositions having satisfactorily nematic phases.

For example, mixtures of 4-cyano-4'-n-pentylbiphenyl and 4'-n-butylphenyl-4-anisoate in various proportions of 0 to 100 mole percent showed a continuous nematic/isotropic transition temperature line and no smectic phase. The nematic temperature range was from below 0° C to about 28° C for a 50 mole percent mixture for these two compounds.

The second group of compounds compatible with cyanobiphenyls, which are also NDA ester-type, have the formula

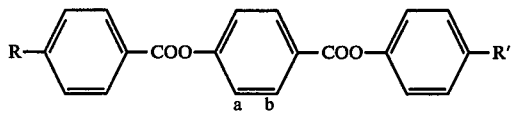

wherein R and R' are alkyl groups of 1 to 7 carbon atoms and $a$ and $b$ can be hydrogen or either $a$ or $b$, but not both can be chlorine. These compounds are known as double esters and have been found to be suitable diluents for cyanobiphenyls.

For instance, mixtures of 4-cyano-4'-n-pentylbiphenyl and 4'-n-pentylphenyl-3-chloro-4-(4'-n-penlylbenzoyloxy) benzoate were nematic in all proportions, between 0 and 100 mole percent, of each constituent, and the nematic-isotropic transition temperature was a smooth, continuous function of concentration.

The third class of compounds which was discovered to be miscible in all proportions with cyanobiphenyls were cyanoesters which are PDA have the following formula:

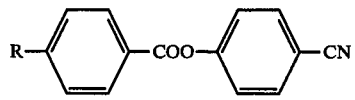

wherein R is a lower alkyl or alkoxy group having from 1 to 9 carbon atoms. For example, 4-cyano-4'-n-pentylbiphenyl and 4'-cyanophenyl-4-n-heptyl benzoate blended smoothly without any discontinuous physical characteristics and without the presence of any smectic phase.

Generally, from about 20 to about 90 mole percent of these classes of "compatible" ester-type liquid crystals blended with cyanobiphenyl liquid crystal results in liquid crystals having very acceptable nematic and electrical properties. The capacitance and resistivity of the combination was significantly improved over pure cyanobiphenyl liquid crystal, resulting in lower power consumption and having the threshold voltage and saturation voltages low enough to permit actuation in a 12.5 micron thick twisted nematic liquid crystal display cell with voltages under 3.5 $V_{rms}$. Unfortunately, however, such ester-biphenyl mixtures were inferior in nematic properties to a class of "incompatible" nematic esters.

While I found the above three classes of esters to be compatible with cyanobiphenyls, I found generally that alkyl- or alkoxy-ester-type liquid crystals were not suitable for mixing with cyanobiphenyls as they formed a smectic and not nematic phases. The following formula represents the incompatible ester-types:

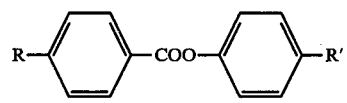

wherein R and R' are alkyl groups having 1 to 7 carbon atoms and alkoxy groups having 2 to 7 carbon atoms.

A preferred incompatible ester-type liquid crystal for the present invention which gave the best supplemental electro-optical effects to the resulting composite is 4'-n-hexyloxyphenyl-4-n-butylbenzoate (HPBB) because it has the desirable properties of a low viscosity, low melting point, wide nematic temperature range and reduced capacitance. In fact, it is extremely advantageous for combining with nematic cyanobiphenyls. These characteristics appear retained when mixed with nematic biphenyls in the present invention. Accordingly it would be highly desirable to combine the HPBB with biphenyl except for the loss of nematic phase. Thus, as one major feature of novelty I have found this can be done as long as one or more of the compatible esters is also added. Then the resulting composite has improved electro-optical properties which are better than the ester-type or biphenyl could give alone.

No theoretical explanation has been developed as to why compounds of this class are unsuited for blending with cyanobiphenyls; however, it is postulated that the relative polar contribution of the methoxy, as compared with higher alkoxy groups and with alkyl groups effects the compatibility with cyanobiphenyls.

In another respect, I had discovered through practice that it is of advantage to prepare liquid crystal blends which consist essentially of more than two liquid crystal compounds. Each class of liquid crystal, when mixed with various other classes of liquid crystals, may impart either desirable physical or electrical characteristics and, similarly, may impart undesirable characteristics to the blended liquid crystal. While it is impossible to predict in advance what the characteristics the constituents will transpose into the blend, as exemplified by the appearance of the smectic blend on blends of liquid crystals in which neither constituent exhibited smectic phase in the ambient temperature range; I have discovered, largely through trial and observation that some particular classes of liquid crystal compounds can be blended with certain other classes, or members of classes, to provide multiple constituent compositions having predictable characteristics.

Thus, at this point, I tried to add a compatible ester-type to liquid crystal mixtures of a cyanobiphenyl and an incompatible ester-type and very surprisingly discovered that smectic phases and other undesirable characteristics were suppressed and smooth nematic compositions were formed when sufficient concentrations of the compatible ester-type was present. Moreover, unbelievably, the beneficial characteristics of cyanobiphenyls were still present and the beneficial characteristics normally associated with the incompatible ester-types were also present. In fact, the poor nematic temperature ranges and high electrical capacitances which cyanobiphenyls inherently have were replaced in the total composition by more desirable nematic temperature ranges and lower capacitances. Moreover, the cost of the composition was considerably lowered because the high-priced cyanobiphenyl was replaced to a great extent by the cheaper ester-type. A broad effect of this discovery, I realized at the time, was that one skilled in the art could obtain a composite liquid crystal composition which would retain the commercial advantages of biphenyls, yet would lose their physical shortcomings and replace them with far better physical characteristics which made the composite commercially viable into a satisfactory nematic characteristic for use in field-effect apparatus.

Then, at that time, I proceeded with more experimentation on the above concepts. In the past, I had found that blends of positive dielectric anisotropic (PDA) liquid crystals and negative dielectric anisotropic (NDA) liquid crystals gave outstanding results. This concept has been the subject of the co-pending patent application by me. See Ser. No. 502,658.

Quite fortuitously and surprisingly it happens that these "compatible" nematic esters materials above have both polarities (i.e. the first and second ground are NDA and the third is PDA) and, accordingly, they can be mixed in different combinations with the above cyanobiphenyl-HPBB mixture to not only "induce" the nematic phase, but to adjust the polarity. See U.S. application Ser. No. 502,659. Thus, for the above classes of liquid crystals in the present invention, we must consider whether they are PDA or NDA and to blend them as numbers of one or the other of these dielectric anisotropy classes.

PDA liquid crystals include:

(a) Cyanobiphenyls of the class of compounds having the formula

where R is a 1 to 9 carbon atom alkyl or alkoxy group; and (b) Cyanoester types of the class of compounds having the formula

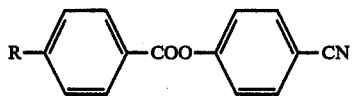

wherein R is a 1 to 9 carbon atom alkyl or alkoxy group. NDA liquid crystals which are compatible include:

(c) Methoxy ester-types of the class of compounds having the formula

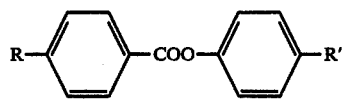

wherein either R or R' is methoxy and R and R' are 1 to 9 carbon atom alkyl or alkoxy groups; and (d) Double ester-types of the class of compounds having the formula

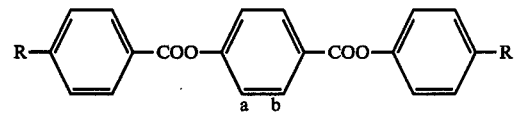

wherein R and R' are 1 to 7 carbon atom alkyl groups and $a$ and $b$ are either hydrogen, or either $a$ or $b$, but not both may be chloride.

NDA liquid crystals which are "incompatible" are:

(e) Ester-type of the class of compounds having the formula

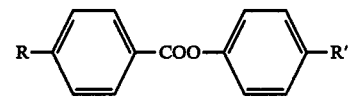

wherein R and R' are 1 to 7 carbon atom alkyl groups or 2 to 7 carbon atom alkoxy groups.

As stated above and as the subject of U.S. application Ser. No. 502,659 I discovered that the smectic phase in compositions which consist essentially of cyanobiphenyls of (a) mixed ester-types of (e) can be suppressed by adding yet another ester-type or mixtures of ester-types of classes (c) and (d). Moreover, as discussed in that application, I found that the cyano ester-type liquid crystals of (b) could be added to the above mixture. Such mixtures resulted in desirable nematic characteristics far below ambient temperatures and yet preserving high nematic-isotropic transaction temperatures and the other good electro-optical characteristics.

For a preferred embodiment of the present invention the PDA constituent comprises one or more cyanobiphenyls from class (a) with or without the addition of one or more cyanoesters from class (b). The preferred range of PDA is 40–80 mole percent of the total composition. The PDA constituent comprises at least about 40 mole percent of the cyanobiphenyl. Thus, the PDA liquid crystal constituent can generally consist of from about 40 to 100 mole percent of cyanobiphenyls (preferably 65–95 mole percent) selected from compounds of the formula

wherein R is a 1 to 9 carbon atom alkyl or alkoxy group, and from 0 to about 60 mole percent of cyanoesters selected from compounds of the formula

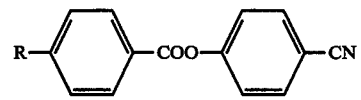

wherein R is a 1 to 9 carbon atom alkyl or alkoxy group. The cyanoesters were selected because they seem to optimize the total compositions and help balance the NDA effect of ester-types of (c) and (d). The most preferred biphenyls are 4'-n-heptylcyanobiphenyl, 4'-n-pentyl-cyanobiphenyl and mixtures thereof.

In general, any low molecular weight cyanoester liquid crystal can be mixed in any proportion to the biphenyl liquid crystal, although the preferred range is from 20 mole percent to 90 mole percent of the biphenyl liquid crystal. The preferred cyanoester is 4'-cyanophenyl-4-n-heptylbenzoate.

The NDA constituent may consist of one or more of the methoxy esters of class (c); one or more of the double esters of class (d); or the incompatible ester-type of (e) or mixtures of members of these classes of esters. The preferred range for the NDA liquid crystal is a 20–60 mole percent of the total composition.

Double esters of class (d) and mixtures of the same should comprise no more than about 25 mole percent of the final liquid crystal composition and, when mixed with other NDA liquid crystals, constitute no more than about 50 mole percent of the NDA constituent. Optimally, the class (d) double ester comprises from about 0 to about 50 percent of the NDA constituent of the liquid crystal composition.

The NDA constituent may consist of all ester-type of classes (c) and (e) above or mixtures of these ester-types in all proportions; i.e. the NDA may range from 50 to 100 mole percent (c) and (e) ester-types and from 0 to 50 mole percent double ester, the optimum range for double ester, when present, being from about 15 to about 20 mole percent of the total liquid crystal composition.

It should be noted that when classes (c) and (e) of this invention are combined, they form a new class of compounds having the formula

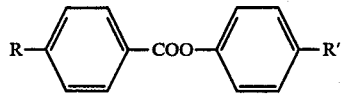

wherein R and R' are alkyl or alkoxy groups having 1 to 7 carbon atoms. This formula represents the NDA component which can be present in this preferred embodiment of the present invention.

Now, the present invention is specially directed at adding one or more chiral additives to the above liquid crystal compositions. These chiral compounds are represented by formulas given above. The most preferred chiral additive is 4'-(S-2-methylbutoxy) phenyl-4-n-hexylbenzoate. These additives such as this one and like the nematic liquid crystals, should be chemically inert, and moisture resistance material.

The chiral additives are optically active nematic liquid crystals which act like cholesteric liquid crystals. For the present invention they can be present in a range of from about .05 to 10.0 mole percent. The preferred range is 0.5 to 5.0 mole percent.

These additives have many important effects on the PDA (biphenyl) and NDA-(ester-type) mixture of the present invention. The principal effects are faster response times and alignment-correcting for the liquid crystal mixture. Also, threshold voltage will be raised upwards by the addition of this type of additive.

Specifically, liquid crystal compositions of the present invention contain enough PDA material to assure fast turn on response time, even at three volts. Also, the fast decay time of the cyanobiphenyl materials has been conserved in the present invention. Even if the display was energized with two or three times higher voltages than the saturation voltages the decay time was not affected appreciably (of course, the turn-on rise time got shorter at higher voltages). Also, the chiral additives diminish the effects that slight changes in PDA concentrations or external factors have on response times. In particular, changes of these characteristics can cause extreme response time sensitivities, and the compositions containing chiral additives are less sensitive to them. Moreover, the additives appear to have the effect of equalizing the Switch ON and Switch OFF times. This can be especially beneficial when utilized on display devices such as watches which have quick repetitive changes in displays. The preferred chiral additive is 4'-(S-2-methylbutoxy) phenyl-4-n-hexylbenzoate. Other typical chiral additives are 4'-n-hexyloxyphenyl-4-(S-2-methylbutoxy) benzoate, 4'-cyanophenyl-4-(S-2-methylbutoxy) benzoate, 4'-n-butoxyphenyl-4-(S-2-methylhexyloxy) benzoate, 4'-cyanophenyl-4-(S-2-methylhexyloxy) benzoate, 4'-(S-2-methylhexyloxyphenyl)-4'-n-hexylbenzoate.

Furthermore, when chiral additives are incorporated into the present biphenyl-ester formula, any undesirable reverse-twist-type misalignments were eliminated. It is believed these misalignments occurred in the first place because there is a randomness in the substrate and liquid crystal in the absence of chiral. It has been theorized that the chiral additive gives liquid crystal an internal twist basis which eliminates such misalignments.

The threshold and saturation voltages required are usually achieved by simply adjusting the concentration of the PDA materials. However, when the PDA concentration in an LC composition is very high as in the present invention (at least 40–80% PDA material) these voltages cannot be easily adjusted. For purposes of this application, threshold voltage is defined as that LCD-field effect voltage necessary to derive approximately 10% optical transmission response level. Saturation voltage is a similar term defining the voltage necessary to obtain a 90% optical transmission response level.

Moreover, the present formulation exhibited very good operating properties at low temperatures; far better than other formulae tested. In particular, the formula was switched on and off completely at 10° C and at 0° C, and the response time was less than a second. Most important, when different LCD cells were operated with composition according to this invention, their response time vs. voltage change characteristic was reproduced very consistently.

In all, the present compositions have a desirable "water-clear" appearance and are relatively moisture insensitive with a nematic temperature range between −30° C and +70° C. They will also be compatible with any conventional liquid crystal display substrate.

|    | Constituent | Weight % |
|----|-------------|----------|
|    | Example 1A |          |
| 1) | 4'-cyanophenyl-4-n-heptylbenzoate | 60 |
| 2) | 4-cyano-4'-n-pentylbiphenyl | 40 |
|    | Example 1B |          |
| 3) | 4'-n-pentylphenyl-3-chloro-4-(4'-n-pentylbenzoyloxy) benzoate | 60 |
| 2) | 4-cyano-4'-n-pentylbiphenyl | 40 |
|    | Example 1C |          |
| 1) | 4'-cyanophenyl-4-n-heptylbenzoate | 40 |
| 2) | 4-cyano-4'-n-pentylbiphenyl | 40 |
| 3) | 4'-(4'-n-pentylbenzoyloxy)benzoate |    |

Any of the mixtures (A), (B) and (C) can be mixed and each will form a satisfactory nematic phase for use in field-effect LC display devices. In other words, Constituents 1 and 3 in the Example are nematic ester-type liquid crystals which are compatible with Constituent 2, a nematic cyanobiphenyl liquid crystal material.

Mixing of the constituents consists of weighing the components, placing them all into a suitable (glass) container, and heating them to a temperature of between 60° C and 70° C, with constant agitation to form an isotropic liquid. This liquid is filtered while hot; it is then ready for filling liquid crystal devices.

Beckman Model 701 LCD is a small field-effect display specifically designed for electronic digital watch module applications. Model 701 provides standardized mechanical configurations and electrical specifications for 92 hours (3-½ digit) application. Significant features include: 1.0 μW typical average power consumption; CMOS compatible drive characteristics; transmissive designs for back lighting and reflective designs for ambient lighting; and excellent readability in high ambient lighting conditions.

The mixture of Example 1(C) was used in a 12.5 micron average thickness field-effect liquid crystal display cell (Beckman Model 701) and the following electro-optic characteristics were measured at 25° C.

|  |  |
| --- | --- |
| Threshold Voltage | .95v |
| Saturation Voltage | 1.70v |
| Turn On Delay Time | 60ms (at 3v) |
| Rise Time | 60ms 8at 3v) |
| Decay Time | 300ms (at 3v) |

The threshold and saturation voltages are relatively lower than prior art liquid crystal displays using Schiff-base and Schiff-base ester-type mixtures.

The total "switch-on" time (i.e. Turn-On Delay Time plus Rise Time) and Total switch-OFF time are both brief enough so that the mixture could be used in displays which require an information updating within a time span of less than a second. However, the 1(C) mix does not respond as fast as the mixtures of Examples 3 and 6, thus illustrating the importance of the added need for the "incompatible" ester.

| Example 2 | | |
| --- | --- | --- |
| | Constituent | Weight % |
| 1) | 4-cyano-4'-n-pentyl-biphenyl | 50 |
| 2) | 4'-n-hexyloxyphenyl-4-n-butyl benzoate | 50 |
| | | 100 |

When these constituents were mixed together according to the method shown in Example 1 and placed in a display cell, the mixture has inoperative photo-optical characteristics because a smectic phase is formed. Thus, this mixture cannot be used in field-effect liquid crystal display cells.

| Example 3 | | |
| --- | --- | --- |
| | Constituent | Mole % |
| 1) | 4'-n-hexyloxyphenyl-4-n-butyl benzoate | 23.87 |
| 2) | 4-cyano-4-40 -pentylbiphenyl | 56.17 |
| 3) | 4'-n-pentylphenyla-3-chloro-4- (4'-n-pentylbenzoyloxy) benzoate | 19.96 |
| | | 100.00 |

When this mixture was mixed according to the method of Example 1 and placed in the same kind of Beckman Model 701 Liquid Crystal Display Cell, the mixture had the following electro-optical characteristics.

|  | 25° C | 0° C |
| --- | --- | --- |
| Threshold Voltage | 1.05v | 1.4v |
| Saturation Voltage | 1.85v | 2.50v |
| Turn On Delay Time | 40ms (at 3v) | 200ms (at 3v) |
| Rise Time | 60ms (at 3v) | 400ms (at 3v) |
| Decay Time | 210ms (at 3v) | 600ms (at 3v) |

This mixture formed a nematic phase; this Example illustrates that a smectic phase, formed by Constituents #1 and #2, is suppressed by the presence of a "compatible" ester-type material (Constituent 3). Comparison of the response times of this example with Example 1 shows that the response times here are slightly better than 25° C. Further, the times given here for operation at 0° C shows that this mixture can be operated at both ambient and sub-ambient temperature ranges (i.e. these times are under one second at 0° C). Therefore, because of this broad operating temperature range, this mixture would have a better chance for commercial applications. And, in fact, the broader operating range is due primarily to the inclusion of the "incompatible" constituent (1).

| Example 4 | | |
| --- | --- | --- |
| | Constituent | Mole % |
| 1) | 4'-n-hexyloxyphenyl-4-n-butylbenzoate | 8.64 |
| 2) | 4-cyano-4'-n-pentyl-biphenyl | 39.30 |
| 3) | 4-cyano-4'-n-heptylbiphenyl | 25.17 |
| 4) | 4'-n-pentylphenyl-3-chloro-4- (4'-n-pentylbenzoyloxy) benzoate | 26.89 |
| | | 100.00 |

This mixture can be mixed together according to the method of Example 1 and will give the desirable nematic phase because of the inclusion of "compatible" ester-type liquid crystal (Constituent 4). This example differs from the preceding one because of the inclusion of two biphenyl liquid crystal compounds. The use of two biphenyls will have the effect of lowering the melting point of both (analogous to obtaining an eutectic point by mixing two liquids). This lowering of the melting point will have the effect of extending the nematic temperature range. Moreover, the two biphenyls picked here do not upset the electro-optical properties of either (used alone) because they are closely matched.

Thus this example illustrates that it is advantageous to use more than one member of a "basic" (cyanobiphenyl) type of nematic liquid crystal material to obtain improved characteristics.

| Example 5 | | |
| --- | --- | --- |
| | Constituent | Mole % |
| 1) | 4'-n-hexyloxyphenyl-4-n-butylbenzoate | 8.64 |
| 2) | 4'-cyanophenyl-4-n-heptylbenzoate | 9.53 |
| 3) | 4-cyano-4'-n-pentyl-biphenyl | 39.30 |
| 4 | 4-cyano-4'-n-heptyl biphenyl | 25.17 |
| 5) | 4-n-pentylphenyl-3-chloro-4- (4'-pentylbenzoyloxy) benzoate | 17.37 |

A mixture of these constituents can be mixed according to the method of Example 1. This example differs from the preceding ones by the inclusion of Constituent (2), which is a "compatible" ester-type nematic liquid crystal. This component optimizes the electro-optical properties of the whole mixture. The precise reasons are not exactly and fully known in this instance, but it is theorized that because it is a positive dielectric anisotropic material, it provides the mixture with a balance against the negative dielectric materials (Constituents 1 and 5), thus adjusting the polarity of the mixture to an optimum level.

| | Example 6 | |
|---|---|---|
| | Constituent | Mole % |
| 1) | 4'-n-hexyloxyphenyl-4-n-butylbenzoate | 8.64 |
| 2) | 4'-cyanophenyl-4-n-heptylbenzoate | 9.53 |
| 3) | 4-cyano-4'-pentyl-biphenyl | 39.30 |
| 4) | 4-cyano-4'-n-heptylbiphenyl | 25.17 |
| 5) | 4'-n-pentylphenyl-3-chloro-4-(4'-n-pentylbenzoyloxy) benzoate | 15.67 |
| 6) | 4'(5-2-methylbutoxy)phenyl-4-n-hexylbenzoate | 1.70 |

This mixture has been mixed together according to the method taught in Example 1 and the following electro-optical characteristics have been measured in a 12.5 micron average thickness liquid crystal display cell (Beckman Model 701) as in Example 1.

| | 25° C | 0° C |
|---|---|---|
| Threshold Voltage | 1.1v | 1.4 |
| Saturation Voltage | 1.8v | 2.5 |
| Turn On Delay Time | 50ms (3v) | 170 (3v) |
| Rise Time | 50ms (3v) | 150 (3v) |
| Decay Time | 90ms (3v) | 250 (3v) |

The comparison of the data at 25° C to that data of 0° C shows that at both temperatures excellent electro-optic characteristics are achieved. In other words, the present composition can be used both at normal ambient temperature and sub-ambient temperatures. Furthermore, total switch-on time (e.g. Turn On Delay plus Rise Time) is almost equal to switch-off time (i.e. Decay Time). Thus the Switch-ON and Switch-OFF times are nearly symmetrical and are especially suited for displays like wrist watches. This is due primarily to the chiral additive Constituent 6).

In particular, threshold and saturation voltages are low enough at both temperatures to be superior to those liquid crystal compositions known in the prior art. This low voltage further ensures good "on state" viewability of the display devices. Also, the response times are small enough at both temperatures so that this composition could be easily used on displays which require an information updating within a time span of far less than a second. In fact, less than 1/10 of a second is preferred to switch on and switch off in a watch-type application. Even at 0° C, switch ON and OFF times are less than 0.3 seconds which is still an excellent result. The times are measured at a $3.0V_{rms}$.

Other electro-optical characteristics of this composition observed were less electrical capacitance than pure biphenyl compositions, hence devices having this composition will require less electric current. This composition also exhibited excellent alignment characteristics in various twisted-nematic display substrates other than Beckman Model 701. More specifically, the beneficial effects are the absence of reverse-twist or reverse-tilt type defects. In fact, these defects impaired the optical qualities of twisted nematic displays which plagued the industry until this invention.

Furthermore, this composition has no substantial spectral absorption within the wavelength range of visible light. In other words, it is colorless and relative non-absorptive; hence detrimental photo-chemical reactions are absent.

Also, because of the above excellent characteristics, the repeatability and long-term performance of this composition in various display devices was very good.

EXAMPLE 7

Also, as a further example of the features of this invention, the composition of Example 6 can be "tinted" by addition of a suitable coloring agent, such as an organic dye. Such a "tinted" twisted nematic liquid crystal display will afford evident advantages for some applications. Methylene Blue is one example of a dichloric dye which may be employed.

Ester-types of above class (e) are not the only types of "incompatible" liquid crystal materials which can be made compatible to biphenyl materials by the additional inclusion to the mixture of biphenyl-compatible-liquid crystals. Other biphenyl-supplementing (incompatible) nematic materials include Schiff-base, liquid crystals, and azo-type, azoxy-type, stilbene-type and tolane-type liquid crystals. The "compatible" liquid crystals which can be added can be any of the above ester-types of above classes (b), (c), (d) or any other "biphenyl-compatible" liquid crystal material.

And further examples of "basic" types of nematic liquid crystals which may be substituted for nematic biphenyls according to the present invention (i.e. to which an incompatible and a compatible liquid crystal may be added) include any basic type of nematic liquid crystal (e.g. Schiff-base, ester-type, azo-type, azoxy-type, stilbene-type, tolane-type and the like). While nematic biphenyls are used only in field-effect liquid crystal display devices because they are PDA and give no "dynamic scatter" effect. But the present invention could be used with compositions which are useful on dynamic scattering and other non-field-effect OC display apparatus. Examples of these compositions may be a combination of NDA-Schiff-base and NDA-ester-type liquid crystals.

Additionally, dyes, special effect materials and other constituents which do not change the nature of these compositions may be included in these liquid crystals without departing from the invention as described and defined.

Specific examples and precise information as to compositions, processes, steps, and other facets of the subject matter of the patent are given herein; however, these precise and detailed data do not define nor limit the inventive concept and are provided to aid those skilled in the art to practice the invention. The scope of the invention is defined and limited only by the claims.

REFERENCES CITED IN THE SPECIFICATION

The following patents and publications are incorporated herein as background material and no representation is made respecting pertinence or completeness:

1. Brown, G. H., CHEMISTRY, 40, 10, 1967
2. Brown, G. H., ANAL. CHEM., 41, 26A 1969
3. Brown, G. H., Shaw, W. G., CHEM. REV., 57, 1049, 1957.
4. AMERICAN CHEMICAL SOCIETY. ORDERED FLUIDS & LIQUID CRYSTALS. (Advances in Chemistry. Ser., No. 63) 1967. 11.50 (ISBN 0-8412-0064-5) Am. Chemical.
5. Brown, G., et al. LIQUID CRYSTALS PROCEEDINGS OF 1965 CONFERENCE, 1967 30.00 Gordon.

6. Gray, G. W., MOLECULAR STRUCTURE & THE PROPERTIES OF LIQUID CRYSTALS. 1962 11.00 (SBN 0-12-296556.6) Acad. Pr.
7. Schuele, Donald E., ed. A REVIEW OF THE STRUCTURE & PHYSICAL PROPERTIES OF LIQUID CRYSTALS. 11.50 Chem. Rubber.
8. U.S. Pat. No. 3,322,485, R. Williams — May 30, 1967.
9. U.S. Pat. No. 3,540,796, J. E. Goldmacher et al, Nov. 17, 1970.
11. U.S. Pat. No. 3,656,834, I. Haller, et al., Apr. 18, 1972.
12. U.S. Pat. No. 3,675,987, M. J. Rafuse, July 11, 1972.
13. U.S. Pat. No. 3,703,329, J. A. Castellano, Nov. 21, 1972.
14. U.S. Pat. No. 3,731,986, J. L. Fergason, May 8, 1973.
15. Sussman, A., IEEE TRANS. ON PARTS, HYBRIDS, AND PACKAGING, Vol. P11p-8, No. 4, Dec. 1972, pp. 24–37.
16. Gray, G. W., Harrison, K. J., Nash, J. A. and Raynes, E. P., Electron Lett., 1973, pp. 616–617.
17. Raynes, E. P., "Improved Contrast Uniformity in Twisted Nematic Liquid Crystal Electro-Optic Display Devices."
18. Gray, G. W., Harrison, K. J., and Nash, J. A., Electron. Lett., 1973, 9, pp. 130–131.
19. Gray, G. W., Harrison, K. J., Nash, J. A., Constant, J., Hulme, D. S., Kirton, J., & Raynes, E. P., "Stable, Low Melting Nematogens of Positive Dielectric Anisotropy for Display Devices", presented at the 166th National Meeting of the American Chemical Society, Chicago, 1974.
20. Harrison, I. T. and Harrison, S., COMPENDIUM OF ORGANIC SYNTHETIC METHODS, Wiley-Interscience, N.Y., 1971, pp. 464–465.
21. March, J., ADVANCED ORGANIC CHEMISTRY: REACTIONS, MECHANISM AND STRUCTURE, McGraw-Hill Book Co., N.Y. 1968, pp. 777–778.
22. Fieser, L. F. and Fieser, M., REAGENTS FOR ORGANIC SYNTHESIS, John Wiley and Sons, Inc., N.Y., 1967, pp. 769–770.
23. U.K. Patent Appln. 51698/72.
24. U.K. Patent Appln. 33709/73.
25. U.K. Patent Appln. 48463/73.

What is claimed is:

1. A composite liquid crystal composition made up of biphenyl and non-biphenyl constituents for use in field-effect liquid crystal display devices, said composition comprising:
   Constituent One — nematic alkylcyanobiphenyl liquid crystal material;
   Constituent Two — ester type nematic liquid crystal material which is incompatible with Constituent One and forms a smectic phase in binary mixture therewith and is present in a concentration sufficient to supplement the composite composition with improved electro-optical properties;
   Constituent Three 13 at least one chloro-substituted double ester nematic liquid crystal material having the general formula

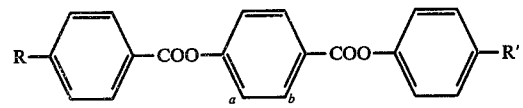

wherein R and R' are alkyl and either $a$ or $b$ is chlorine, either $a$ or $b$ being hydrogen which is compatible with Constituent One and present in a concentration sufficient so that the composite composition forms a satisfactory nematic phase for use in a field-effect display device.

2. The nematic liquid crystal composition of claim 1 wherein the alkylcyanobiphenyl liquid crystal material is 4-cyano-4'-n-pentylbiphenyl or 4-cyano-4'-n-heptylbiphenyl or mixtures thereof.

3. The nematic liquid crystal composition of claim 2 wherein Constituent Two is 4'-n-hexyloxyphenyl-4-n-butylbenzoate.

4. The nematic liquid crystal composition of claim 1 wherein Constituent Three is 4'-n-pentylphenyl-3-chloro-4-(4'-n-pentylbenzoyloxy) benzoate.

5. The nematic liquid crystal composition of claim 1 wherein Constituent Three is 4'-n-pentylphenyl-3-chloro-4-(4'-n-pentylbenzoyloxy) benzoate and the composition further contains 4'-cyanophenyl-4-n-heptylbenzoate.

6. The nematic liquid crystal composition of claim 1 wherein Constituent One is 4-cyano 4'-n-pentylbiphenyl or 4-cyano-4'-n-heptylbiphenyl wherein Constituent Two is 4'-n-hexyloxyphenyl-4-n-butylbenzoate and wherein Constituent Three is 4'-n-pentylphenyl-3-chloro-4-(4'-n-pentylbenzoyloxy) benzoate.

7. The nematic liquid crystal composition of claim 1 wherein Constituent One is the mixture of 4-cyano-4'-n-pentylbiphenyl and 4-cyano-4'-n-heptylbiphenyl, wherein Constituent Two is a 4'-n-hexyloxyphenyl-4-n-butylbenzoate, wherein Constituent Three is 4'-n-pentylphenyl-3-chloro-4-(4'-n-pentylbenzoyloxy) benzoate, and wherein 4'-cyanophenyl-4-n-heptylbenzoate.

8. Liquid crystal electro-optical devices containing the liquid crystal of claim 5.

9. Liquid crystal electro-optical devices containing the liquid crystal composition of claim 1.

10. The liquid crystal electro-optical devices containing the liquid crystal composition of claim 7.

11. A rematic liquid crystal composition having biphenyl liquid crystal dominant electro-optical characteristics and a wide nematic phase temperature range including room temperature, actuable in a twisted nematic liquid crystal display cell by low actuation voltages comprising a component selected from one or more 4'-substituted-4-cyanobiphenyl liquid crystals having the formula

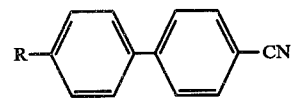

wherein R is a 1 to 9 carbon alkyl or alkoxy group, blended with one or more 4, 4'-disubstituted phenyl benzoate liquid crystals selected from the group consisting of: compounds having the formula

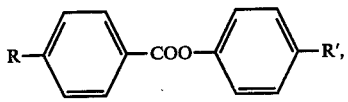

wherein either R or R' is methoxy and the other of R or R' an alkyl or an alkoxy having 1 to 7 carbon atoms;
compounds having the formula

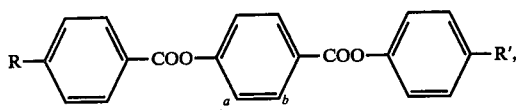

wherein R and R' are 1 to 7 carbon alkyl groups and *a* and *b* are hydrogen or chlorine, but either *a* or *b* being hydrogen; and compounds having the formula

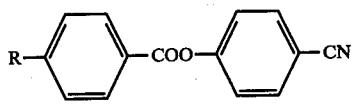

wherein R is a 1 to 9 carbon atom alkyl or alkoxy group optionally further blended with one or more 4,4'-disubstituted phenyl benzoate liquid crystal compounds having the formula

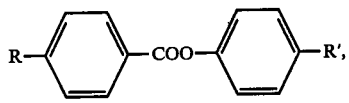

wherein R and R' are alkyl groups having 1 to 7 carbon atoms and alkoxy groups having 2 to 7 carbon atoms; and also containing optically active liquid crystal compounds having the following formulae:

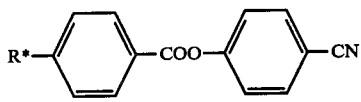

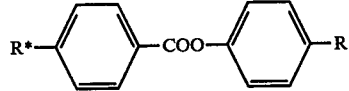

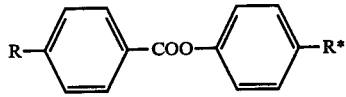

wherein R* is an alkyl or alkoxy having 4 to 9 carbon atoms among which at least one carbon atom is asymmetrically substituted, and R is an alkyl or alkoxy group having 2-7 carbon atoms.

12. The rematic liquid crystal composition as defined in claim 11 consisting essentially of said 4'-substituted -4-cyanobiphenyl component, said cyano-ester component, and said optically active component, wherein said 4'-substituted-4-cyanobiphenyl component comprises from about 10 percent to about 80 mole percent of the liquid crystal composition.

13. The rematic liquid crystal composition as defined in claim 11 including from about 10 to about 80 mole percent of the positive dielectric anisotropy (PDA) constituents and from about 90 to about 20 mole percent of one or more negative dielectric anisotropy (NDA) liquid crystals selected from the group consisting of:

A. said compounds having the formula

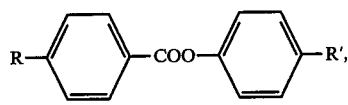

wherein either R or R' is methoxy and the other of R and R' is an alkyl or an alkoxy having 1 to 7 carbon atoms; and
B. said compounds having the formula

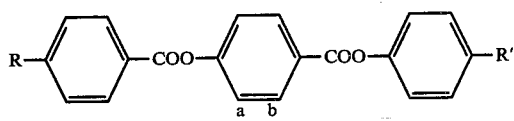

wherein R and R' are 1 to 7 carbon alkyl groups and *a* and *b* may both be hydrogen and wherein either *a* or *b*, but not both, may be Cl, optionally in combination with C. one or more of said compounds having the formula

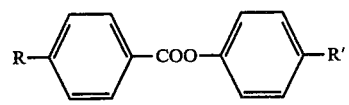

wherein R and R' are alkyl groups having 1 to 7 carbon atoms and alkoxy groups having 2 to 7 carbon atoms.

14. The rematic liquid crystal composition as defined in claim 13 including from about 20 to about 90 mole percent of either the A. or A. in combination with optional C. type liquid crystals 15. The rematic liquid crystal composition as defined in claim 11 up to about 25 mole percent of the total liquid crystal composition and not more than 50 mole percent of the negative dielectric anisotropy constituents of a compound including selected from the group consisting of compounds of the formula

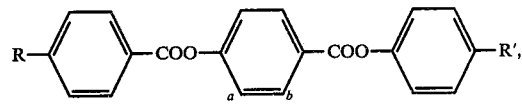

wherein R and R' are 1 to 7 carbon alkyl groups and *a* and *b* may both be hydrogen and wherein either *a* or *b*, but not both, may be Cl.

16. The rematic liquid crystal composition as defined in claim 11 wherein the 4'-substituted-4-cyanobiphenyl component is 4-cyano-4'-n-pentylbiphenyl.

17. The rematic liquid crystal composition as defined in claim 11 wherein the 4'-substituted-4-cyanobiphenyl component is a mixture of about 40 mole percent 4-cyano-4'-n-heptylbiphenyl and about 60 mole percent 4'-n-pentylcyano-biphenyl.

18. The rematic liquid crystal composition as defined in claim 11 wherein the 4'-cyanophenyl-4-alkylbenzoate is 4'-cyanophenyl-4-n-heptylbenzoate.

19. The rematic liquid crystal composition of claim 14 wherein the amount of PDA constituent is from 40–80 mole percent, the amount of NDA constituent is 60–20 mole percent and the amount optically active additive is 0.5–5.0 mole percent.

20. The rematic liquid crystal composition as defined in claim 9 wherein said 4'-substituted-4-cyanobiphenyl component comprises from about 65 to 95 mole percent of said positive dielectric anisotropy consituents in the composition.

21. The rematic liquid crystal composition as defined in claim 19 containing a 4,4'-disubstituted phenyl benzoate ester, which is 4'-n-hexyloxyphenyl-4-butylbenzoate.

22. The rematic liquid crystal composition as defined in claim 21 containing a double ester which is 4'-n-pentylphenyl-3-chloro-4-(4'-n-pentyl-benzoyloxy)benzoate.

23. The rematic liquid crystal composition as defined in claim 22, wherein the optically active additive is 4'-(S-2-methylbutoxy)phenyl-4-n-hexylbenzoate.

24. A rematic liquid crystal composition for use in information handling systems comprising the following liquid crystal constituents:

Constituent One — one or more positive dielectric anisotropy liquid crystals, of which at least one is a 4'-substituted-4-cyanobiphenyl liquid crystal material having the formula

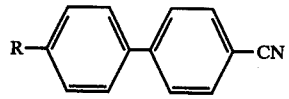

wherein R is a 1 to 9 carbon alkyl or alkoxy group

Constituent Two — one or more low molecular weight negative dielectric liquid crystals of which one is a 4,4'disubstituted phenyl benzoate liquid crystal material having the formula

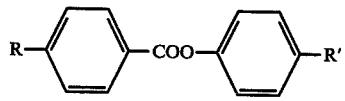

wherein either R or R' is methoxy and the other of R or R' is an alkyl or alkoxy group having 1 to 7 carbons Optional Constituent Three—one or more low molecular weight negative dielectric liquid crystals of which one is a 4,4'-disubstituted phenyl benzoate liquid crystal material having the formula

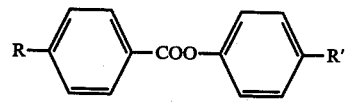

wherein R and R' are alkyl groups having 1 to 7 carbon atoms and alkoxy groups having 2 to 7 carbon atoms; and Constituent Four — one or more chiral additives, comprising a minor amount of the composition and having the formulae

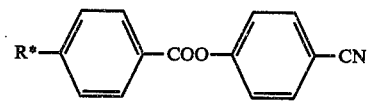

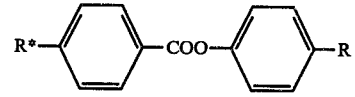

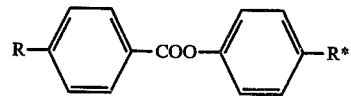

wherein R* is an alkyl or alkoxy having 4 to 9 carbon atoms among which at least one carbon atom is asymmetrically substituted, and R is an alkyl or alkoxy group having 2 to 7 carbon atoms.

25. The rematic liquid crystal composition as defined in claim 24 wherein said 4'-substituted-4-cyanobiphenyl comprises from about 10 percent to about 80 mole percent of the liquid crystal composition.

26. The rematic liquid crystal composition as defined in claim 24 further including up to about 25 mole percent of the total liquid crystal composition and not more than 50 mole percent of the negative dielectric anisotropy constituents of a compound selected from the group consisting of compounds of the formula

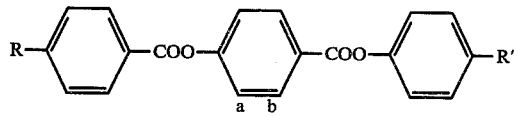

wherein R and R' are 1 to 7 carbon alkyl groups and $a$ and $b$ may be both hydrogen and wherein either $a$ or $b$, but not both, may be Cl.

27. The rematic liquid crystal composition as defined in claim 24 wherein the 4'-substituted-4-cyanobiphenyl is 4-cyano-4'-n-pentylbiphenyl.

28. The rematic liquid crystal composition as defined in claim 24 wherein said 4'-substituted-4-cyanobiphenyl is a mixture of about 40 mole percent 4-cyano-4'-n-heptylbiphenyl and about 60 mole percent 4-cyano-4'-n-pentyl-biphenyl.

29. The rematic liquid crystal composition as defined in claim 24 wherein one of the positive dielectric anisotropy liquid crystals is a 4'-cyanophenyl-4-alkylbenzoate.

30. The rematic liquid crystal composition of claim 24 wherein the amount of PDA constituent is from 40–80 percent, the amount of NDA constituent is 60–20 mole percent and the amount of chiral additive is 0.5–5.0 mole percent.

31. The rematic liquid crystal composition as defined in claim 30 wherein the positive dielectric anisotropy constituent includes said 4'-substituted-4-cyanobiphenyl from about 65 to 95 mole percent of said positive dielectric anisotropy constituent.

32. The rematic liquid crystal composition as defined in claim 30 containing a optional Constituent Three, said constituent being 4'-n-hexyloxyphenyl-4-n-butylbenzoate.

33. The rematic liquid crystal compostion as defined in claim 32 further containing up to about 25 mole percent of the total liquid crystal composition and not more than 50 mole percent of the NDA constituent of 4'-n-pentylphenyl-3-chloro-4-(4'-n-pentyl-benzoyloxy)benzoate.

34. The rematic liquid crystal composition as defined in claim 33, wherein the chiral additive is 4'-(S-2-methylbutoxy) phenyl-4-n-hexylbenzoate.

35. Liquid crystal electro-optical devices containing the liquid crystal composition of claim 24.

36. Liquid crystal electro-optical devices containing the nematic liquid crystal composition of claim 34.

* * * * *

UNITED STATES PATENT AND TRADEMARK OFFICE
CERTIFICATE OF CORRECTION

PATENT NO. : 4,083,797
DATED : April 11, 1978
INVENTOR(S) : Chan S. Oh

It is certified that error appears in the above-identified patent and that said Letters Patent are hereby corrected as shown below:

| | |
|---|---|
| Claim 1, column 17, line 66, | delete "13" and insert -- - --. |
| Claim 6, column 18, line 31, | after "cyano" insert -- - --. |
| Claim 7, column 18, line 43, | after "wherein" insert --the composition further contains--. |
| Claim 9, column 18, line 46, | delete "containg" and insert --containing--. |
| Claim 11, column 18, line 50, | delete "rematic" and insert --nematic--. |
| Claim 11, column 19, line 8, | after "R'" insert --is--. |
| Claim 12, column 19, line 60, | delete "rematic" and insert --nematic--. |
| Claim 13, column 19, line 67, | delete "rematic" and insert --nematic--. |
| Claim 14, column 20, line 38, | delete "rematic" and insert --nematic--. |
| Claim 15, column 20, line 42, | delete "rematic" and insert --nematic--. |
| Claim 15, column 20, line 43, | after "11", insert --including--. |
| Claim 15, column 20, line 46, | delete "including". |

UNITED STATES PATENT AND TRADEMARK OFFICE
CERTIFICATE OF CORRECTION

PATENT NO. : 4,083,797

DATED : April 11, 1978

INVENTOR(S) : Chan S. Oh

It is certified that error appears in the above-identified patent and that said Letters Patent are hereby corrected as shown below:

| | |
|---|---|
| Claim 16, column 20, line 58, | delete "rematic" and insert --nematic--. |
| Claim 17, column 20, line 61, | delete "rematic" and insert --nematic--. |
| Claim 17, column 20, line 65, | delete "4'-n-pentylcyanobiphenyl" and insert --4-cyano-4'-n-pentylbiphenyl--. |
| Claim 18, column 20, line 66, | delete "rematic" and insert --nematic--. |
| Claim 19, column 21, line 1, | delete "rematic" and insert --nematic--. |
| Claim 19, column 21, line 1, | delete "14" and insert --13--. |
| Claim 19, column 21, line 4, | after "amount" insert --of--. |
| Claim 20, column 21, line 6, | delete "rematic" and insert --nematic--. |
| Claim 20, column 21, line 7, | delete "9" and insert --19--. |
| Claim 20, column 21, line 9, | delete "said" and insert --the--. |
| Claim 21, column 21, line 11, | delete "rematic" and insert --nematic--. |

UNITED STATES PATENT AND TRADEMARK OFFICE
CERTIFICATE OF CORRECTION

PATENT NO. : 4,083,797
DATED : April 11, 1978
INVENTOR(S) : Chan S. Oh

It is certified that error appears in the above-identified patent and that said Letters Patent are hereby corrected as shown below:

| | |
|---|---|
| Claim 21, column 21, line 13, | delete "4'-n-hexyloxyphenyl-4-butylbenzoate" and insert --4'-n-hexyloxyphenyl-4-n-butylbenzoate--. |
| Claim 22, column 21, line 16, | delete "rematic" and insert --nematic--. |
| Claim 23, column 21, line 20, | delete "rematic" and insert --nematic--. |
| Claim 24, column 21, line 23, | delete "rematic" and insert --nematic--. |
| Claim 24, column 21, line 40, | delete "4,4'disubstituted" and insert --4,4'-disubstituted--. |
| Claim 25, column 22, line 21, | delete "rematic" and insert --nematic--. |
| Claim 26, column 22, line 25, | delete "rematic" and insert --nematic--. |
| Claim 27, column 22, line 41, | delete "rematic" and insert --nematic--. |
| Claim 28, column 22, line 44, | delete "rematic" and insert --nematic--. |
| Claim 28, column 22, lines 47 and 48, | delete "4-cyano-4'-n-pentyl-biphenyl" and insert --4-cyano-4'-n-pentylbiphenyl--. |

UNITED STATES PATENT AND TRADEMARK OFFICE
CERTIFICATE OF CORRECTION

PATENT NO. : 4,083,797
DATED : April 11, 1978
INVENTOR(S) : Chan S. Oh

It is certified that error appears in the above-identified patent and that said Letters Patent are hereby corrected as shown below:

| | |
|---|---|
| Claim 29, column 22, line 49, | delete "rematic" and insert --nematic--. |
| Claim 30, column 22, line 53, | delete "rematic" and insert --nematic--. |
| Claim 31, column 22, line 58, | delete "rematic" and insert --nematic--. |
| Claim 32, column 22, line 63, | delete "rematic" and insert --nematic--. |
| Claim 32, column 22, line 64, | "a optional" should read --Optional--. |
| Claim 33, column 22, line 67, | delete "rematic" and insert --nematic--. |
| Claim 34, column 23, line 6, | delete "rematic" and insert --nematic--. |

Signed and Sealed this

Nineteenth Day of December 1978

[SEAL]

Attest:

RUTH C. MASON
Attesting Officer

DONALD W. BANNER
Commissioner of Patents and Trademarks